Figure 1:
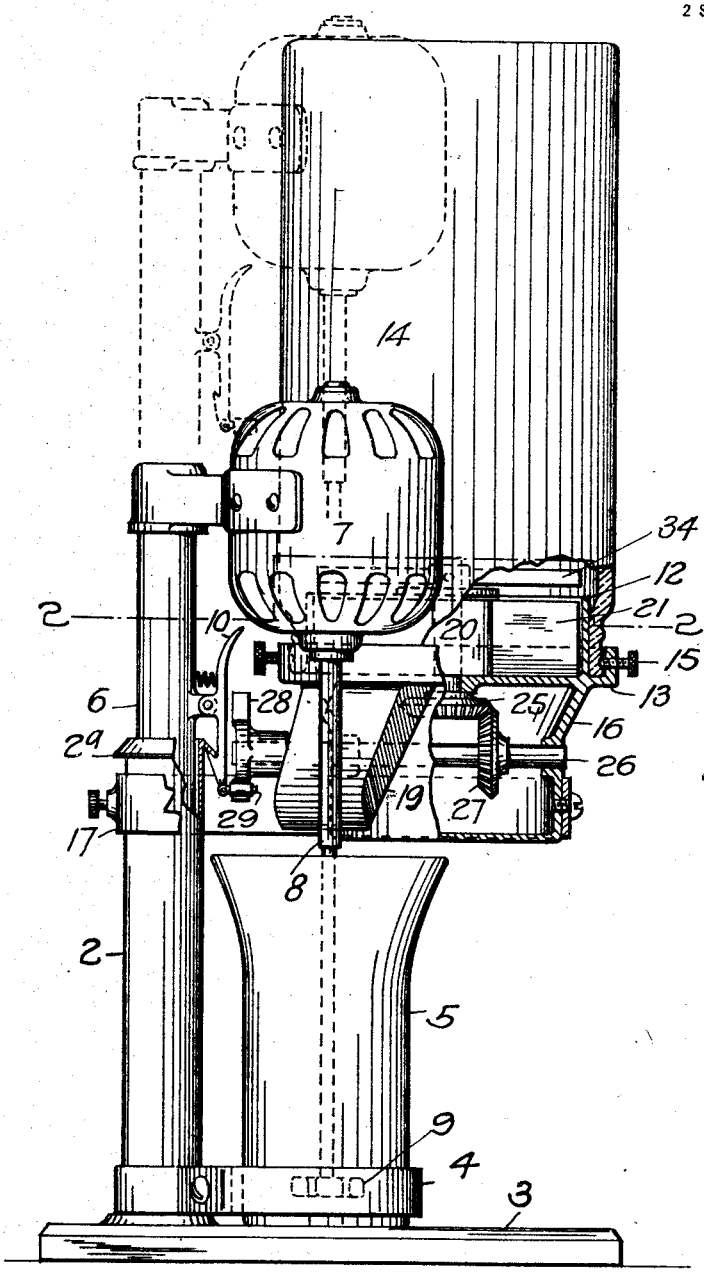

R. W. RIEDEL.
DISPENSING ATTACHMENT FOR BEVERAGE MIXING DEVICES.
APPLICATION FILED JUNE 9, 1920.

1,387,908.

Patented Aug. 16, 1921.
2 SHEETS—SHEET 1.

WITNESS:

INVENTOR.
R. W. RIEDEL
BY
ATTORNEY.

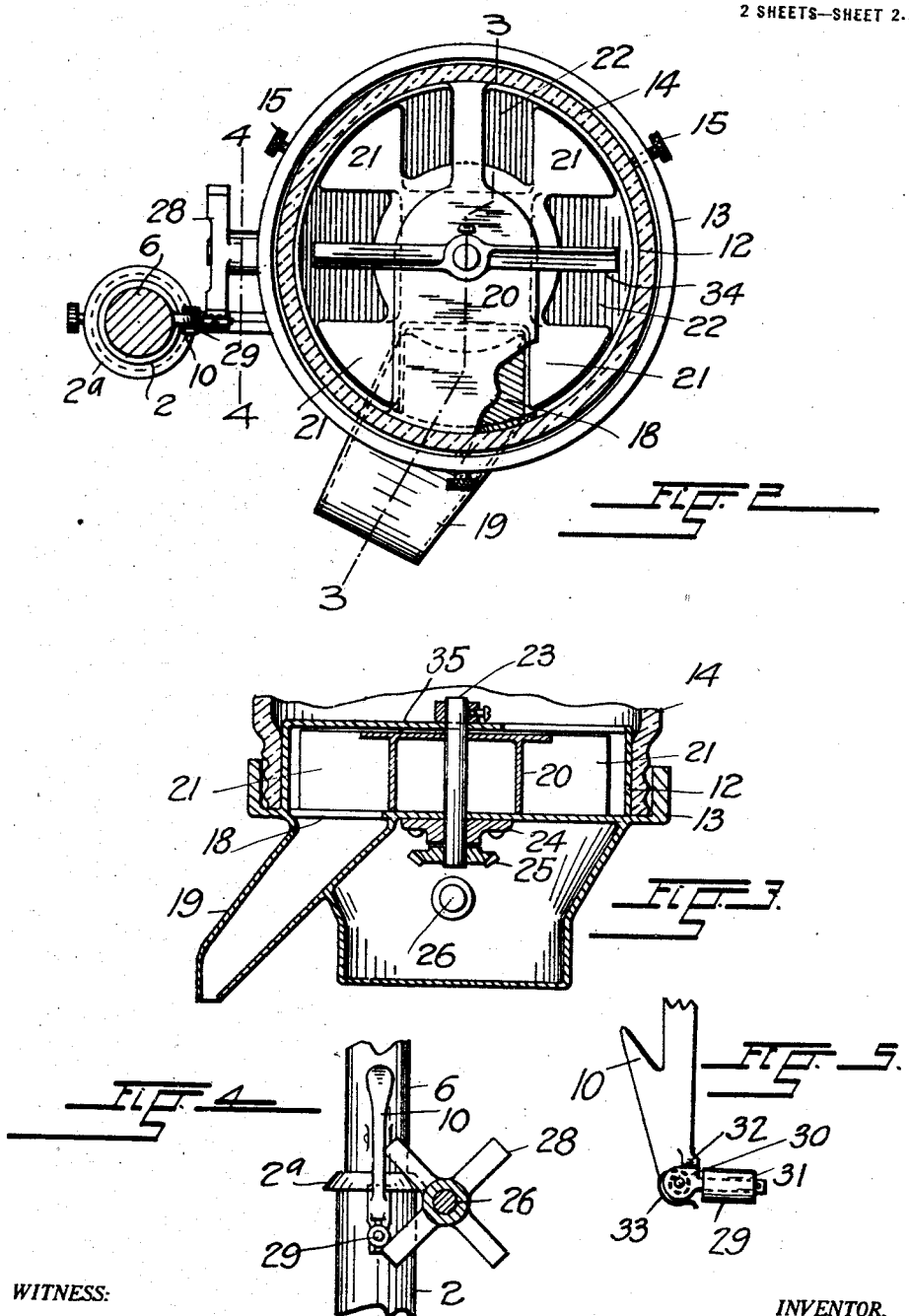

UNITED STATES PATENT OFFICE.

ROBERT W. RIEDEL, OF AULT, COLORADO.

DISPENSING ATTACHMENT FOR BEVERAGE-MIXING DEVICES.

1,387,908.          Specification of Letters Patent.     Patented Aug. 16, 1921.

Application filed June 9, 1920. Serial No. 387,650.

*To all whom it may concern:*

Be it known that I, ROBERT W. RIEDEL, a citizen of the United States, residing at Ault, in the county of Weld and State of Colorado, have invented certain new and useful Improvements in Dispensing Attachments for Beverage-Mixing Devices, of which the following is a specification.

This invention relates to dispensing attachments for automatic beverage mixing devices and its primary object resides in the provision of a simple, durable and highly efficient mechanism which is actuated by the downward movement of the stirring element of an automatic beverage mixing device to deliver a predetermined amount of an ingredient to the receptacle in which the drink is prepared.

My invention is particularly adapted for use in connection with the well-known electric mixing devices of soda fountains and it is especially useful in preparing drinks of powdered malted milk which in order to produce a palatable beverage must be added to the liquid in certain predetermined quantities.

An embodiment of my invention in its preferred form has been shown in the accompanying drawings in the various views of which like parts are similarly designated and in which Fgure 1 is a partially sectional elevation of my invention shown in operative connection with an electric mixing device for soda fountains;

Fig. 2, a horizontal section taken on the line 2—2, Fig. 1;

Fig. 3, a sectional view of the portioning element of the invention on the line 3—3, Fig. 2;

Fig. 4, a section taken on the line 4—4, Fig. 2, and

Fig. 5, an enlarged detail view of the tappet by which the dispensing device is actuated.

Referring more specifically to the drawings the reference character 2 designates the hollow standard of an electric beverage mixing device for soda fountains which as usual is supported upon a base 3 and provided with a clasp 4 to hold a glass 5 in which the beverage is prepared.

A column 6 slidably fitted in the hollow standard carries at its upper end an electric motor the rotary armature of which connects with the downwardly extending shaft 8 of a mixing wheel 9 which in practice is inserted in the glass supported on the base, by downward adjustment of the column.

The standard has at its upper end a downwardly slanting flange 2ᵃ which coöperates with a spring catch 10 on the sliding column for the purpose of holding the motor and the therewith connected stirring member in their adjusted position.

The dispensing attachment consists of a pan 12 of cylindrical form surrounded by a trough 13 to receive the neck of a malted milk bottle 14 of the usual size and form. Set screws 15 extending through threaded openings in the outer wall of the trough serve to secure the bottle against accidental displacement.

The pan constitutes the upper portion of a housing 16 which by means of a clamp 17 is rigidly secured to the standard of the mixing device and it has an opening 18 in its bottom in connection with a downwardly slanting chute 19 through which the material portioned in the dispenser is delivered into the glass or other receptacle supported on the base.

The portioning element of the dispenser consists of a cylindrical hub 20 having integral radially extending arms 21 at quadrant points to provide open sided pockets 22 which are successively brought in register with the discharge opening in the bottom of the pan by an intermittent rotary movement of the hub in the operation of the device.

A plate 35 covering the rotary element above the discharge opening prevents the contents of the bottle 14 from passing directly to the delivery chute, and levels the powder in the pockets before they are brought in register with the opening.

The hub of the portioning element is rigidly mounted upon a shaft 23 projecting through a bearing 24 on the bottom of the pan and carrying a beveled gear-wheel 25 at its end within the housing.

A second shaft 26 mounted in openings in the wall of the housing, at right angles to the other, supports a beveled gear wheel 27 meshing with the gear wheel of the portioning element and it carries at one of its ends projecting outside the housing, a star wheel 28 the radiating arms of which project in the path of a tappet 29 preferably attached to the catch 10 of the mixing device.

The tappet which projects laterally at the end of the catch, is preferably composed of a pivoted stud 30 carrying an anti-friction roller 31. A stop 32 on the catch prevents the tappet from moving upwardly during its engagement with the star wheel and a spring 33 normally holding the tappet against the stop, permits of its downward deflection to idly pass the star wheel when the column to which it is attached is raised to its original position.

In applying the attachment to the standard it is positioned so that the end of its chute extends above a glass or other receptacle of ordinary height placed on the base of the mixing device.

The malted milk bottle fastened in the trough of the housing in an inverted position, discharges its contents into the open pockets of the rotary portioning element and when, for the preparation of a beverage, the motor is moved downwardly to insert the mixing wheel into the glass, the engagement of the tappet on the sliding column with the arm of the star wheel projecting in its path, will impart a quarter turn to the portioning element to bring one of its filled pockets in register with the discharge opening in the bottom of the pan in which it has its movement.

The contents of the pocket passing through the opening into the chute 19, fall into the glass while the empty pocket moves from under the cover plate 22 to receive a new charge from the bottle 14.

A paddle 34 fastened at the end of the shaft 23 above the hub prevents packing of the material in the container supported on the pan and facilitates its movement into the pockets of the portioning element.

Having thus described my invention in the most practical form at present known to me, I desire it understood that the construction and arrangement of its parts are variable so as to adapt the attachment for use on mixing devices of different types and for the support of containers shaped differently from the bottle 14 shown in the drawings.

It will also be apparent that while for convenience in construction the tappet is fastened to the catch on the sliding motor column, it may be attached to any other part thereof without changing the operation of the dispenser and that other variations in the details of construction of my invention may be resorted to without departing from the principle thereof.

What I claim and desire to secure by Letters-Patent is:

1. A dispenser of the character described comprising in combination with an adjustable member of a beverage mixing device, a pan having a discharge opening, means to support an inverted container in superposed relation to the pan, a rotary portioning element in the pan having pockets adapted to receive part of the contents of the container and to register with the discharge-opening, and mechanism to actuate the element by adjustment of said member of the mixing device.

2. A dispenser of the character described comprising in combination with an adjustable member of a beverage mixing device, a pan having a discharge opening, means to support an inverted container in superposed relation to the pan, a rotary portioning element in the pan having pockets adapted to receive part of the contents of the container and to register with the discharge opening, and mechanism for the intermittent rotation of the portioning element by adjustment of said member of the mixing device, including a tappet on the member and a wheel in the path of the tappet, geared to the element.

3. A dispenser of the character described comprising in combination with an adjustable member of a beverage mixing device, a pan having a discharge-opening, means to support an inverted container in superposed relation to the pan, a rotary portioning element in the pan having pockets adapted to receive part of the contents of the container and to register with the discharge opening, a tappet connected to be moved by adjustment of said member of the mixing device, and a wheel geared to the portioning element, in the path of the tappet.

4. A dispenser of the character described comprising a pan having a discharge-opening, means to support an inverted container in superposed relation to the pan, a rotary portioning element in the pan having equidistant pockets adapted to receive part of the contents of the container and to successively register with the discharge-opening, and a star wheel extending in the path of the tappet and geared to the portioning element.

5. The combination of a beverage mixer having a mixing element mounted for downward adjustment, a dispenser adapted to support an inverted container and capable of operation to discharge the contents of the container in determinate portions, and means for the operation of the dispenser by downward movement of the mixing element.

6. The combination of a beverage mixer having a mixing element mounted for downward adjustment, and a catch for locking the element in an adjusted position, a dispenser adapted to support an inverted container and capable of operation to discharge the contents of the container in determinate portions, and means coöperating with said catch for the operation of the dispenser by downward movement of the mixing element.

In testimony whereof I have affixed my signature.

ROBERT W. RIEDEL.